United States Patent [19]

Stoffel

[11] 4,193,092
[45] Mar. 11, 1980

[54] IMAGE INTERPOLATION SYSTEM

[75] Inventor: James C. Stoffel, Rochester, N.Y.

[73] Assignee: Xerox Corporation, Stamford, Conn.

[21] Appl. No.: 917,613

[22] Filed: Jun. 21, 1978

[51] Int. Cl.$^2$ ............................................. H04N 3/14
[52] U.S. Cl. .................................. 358/136; 358/133; 358/135; 358/260
[58] Field of Search ............... 358/135, 136, 260, 160, 358/180, 133; 340/347 DD

[56] References Cited

U.S. PATENT DOCUMENTS

| | | | |
|---|---|---|---|
| 2,921,124 | 1/1960 | Graham | 358/135 |
| 4,020,282 | 4/1977 | Halpern | 340/347 DD |
| 4,117,470 | 9/1978 | Elliott | 340/347 DD |

*Primary Examiner*—David L. Stewart

[57] ABSTRACT

Analog image data pixels are sampled and held to produce a box car wave representative of the image data. Wave height differences are bridged by linear interpolation, with frequency enhancement imposed at the bridge junctures. The modified image wave is thresholded and sampled at a multiple of the original frequency to provide an image pixel stream comprised of both original image pixels having one or more interpolated image pixels therebetween.

One or more intermediate image lines are interpolated by comparing binary image data, portions of which may be interpolated, on a pixel by pixel or multiple pixel basis one line pair at a time. The pixel comparison produces an address used to identify a specific image pixel pattern from multiple image pixel patterns stored in memory. The image pixel pattern taken from memory is used to form the interpolated intermediate line or lines.

13 Claims, 11 Drawing Figures

FIG. 7

IMAGE INTERPOLATION SYSTEM

This invention relates to an image data handling system, and more particularly, to an image data handling system with data interpolation permitting minimal image input samples while providing increased image output samples for good output image resolution.

Where image data in the form of analog or binary signals is to be handled, the generation of the image data, storage of the data, and transmission of the image data to one or more output stations where the data may be used to produce copies of the original represented by the data, presents conflicting problems in terms of the cost and complexity of the apparatus required versus the quality and resolution of the copies produced. Where one attempts to optimize the quality and resolution of the copies produced, the price paid is usually reflected in increased cost and complexity of the image data producing and handling apparatus, i.e. in the data generating apparatus required to provide image samples or pixels in greater density, in a larger memory to store the image data pending use, and in increased data bandwidth on transmission of the data from one point to another. On the other hand, where one attempts to reduce and alleviate cost and simplify the data generating and handling apparatus by making fewer samples of the original, the savings is usually at the expense of decreased image resolution and quality.

This invention is to a method of handling data representing of an image in pixel form to enhance image output quality and reduce image data storage requirements and transmission bandwidth, the steps which comprise: providing image pixels representative of an image on a line by line basis; at the input station, interpolating additional image pixels from the image pixels originally scanned; and at an output station, interpolating at least one additional line of image pixels for each line of image pixels from the image pixels previously obtained.

The invention further relates to a method of interpolating at least one line of image data from at least one known line of image data, the steps which consist of: buffering a block of binary image pixels from the known line to provide an address; addressing a memory having discrete image patterns with the address; outputting the image pattern addressed to provide a portion of the line being interpolated; and, successively repeating the preceeding steps to complete the interpolated line of image data.

Other objects and advantages will be apparent from the ensuing description and drawings in which:

FIG. 7 is a schematic illustrating a representative number of the image pixel patterns stored in memory and the addresses therefor;

Figure 1:
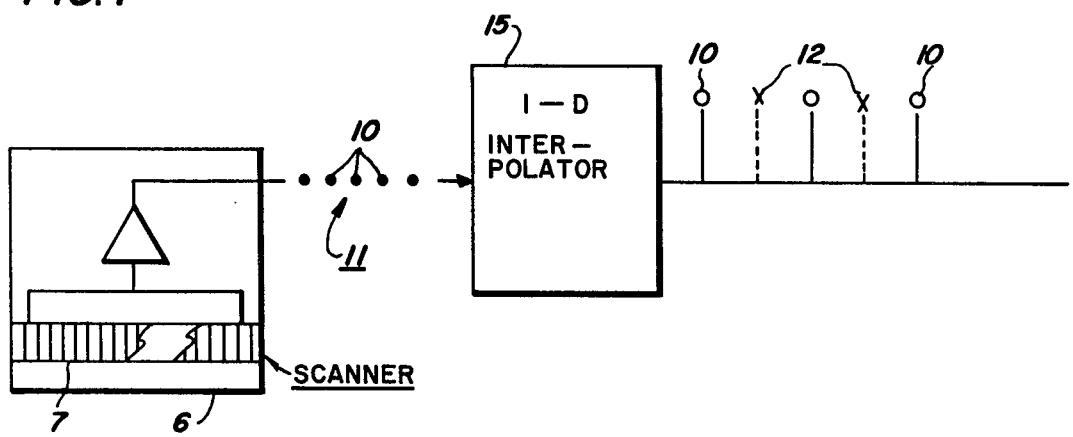
FIG. 1 is a schematic view showing interpolation of additional image pixels in a serial pixel stream of image data.
Figure 2:
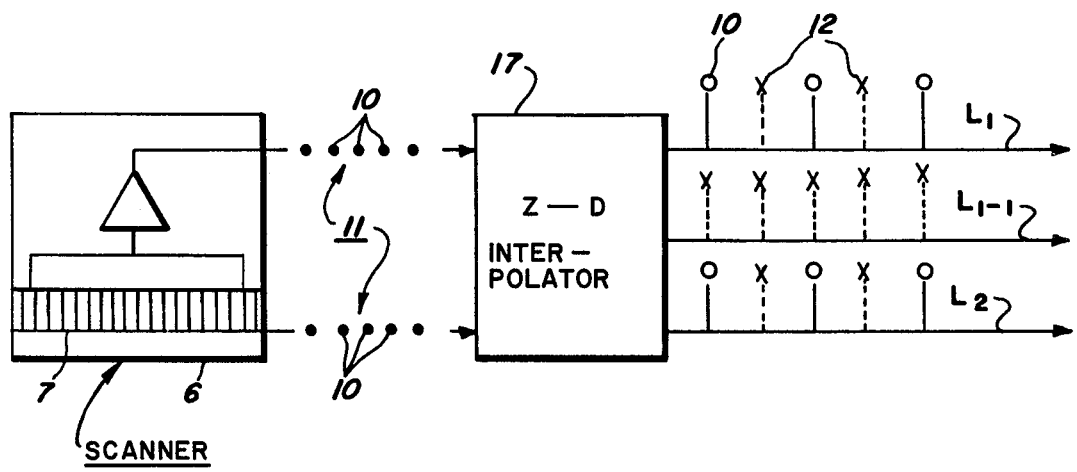
FIG. 2 is a schematic view showing interpolation of additional image pixels both within a line pair of pixels and of an additional line of pixels between the line pair.

Referring to FIGS. 1 and 2, there is provided a schematic illustration showing interpolation of additional image pixels 12 between real or original pixels 10 in a serial pixel stream 11 (FIG. 1) and, in FIG. 2, interpolation of an additional image line ($L_{1-1}$) between a pair of image lines ($L_1$, $L_2$) as performed by the present invention. Pixels herein refer to video image data samples or picture elements and may comprise either an analog or binary representation of the image data value at a point. Pixels 10 may, for example be obtained through line by line scanning of an image bearing original 6 by one or more arrays of charge coupled devices 7, commonly referred to as CCD's. One CCD is a Fairchild CCD 121-1728 pixel 2-phase linear array by Fairchild Manufacturing Company.

Figure 8:
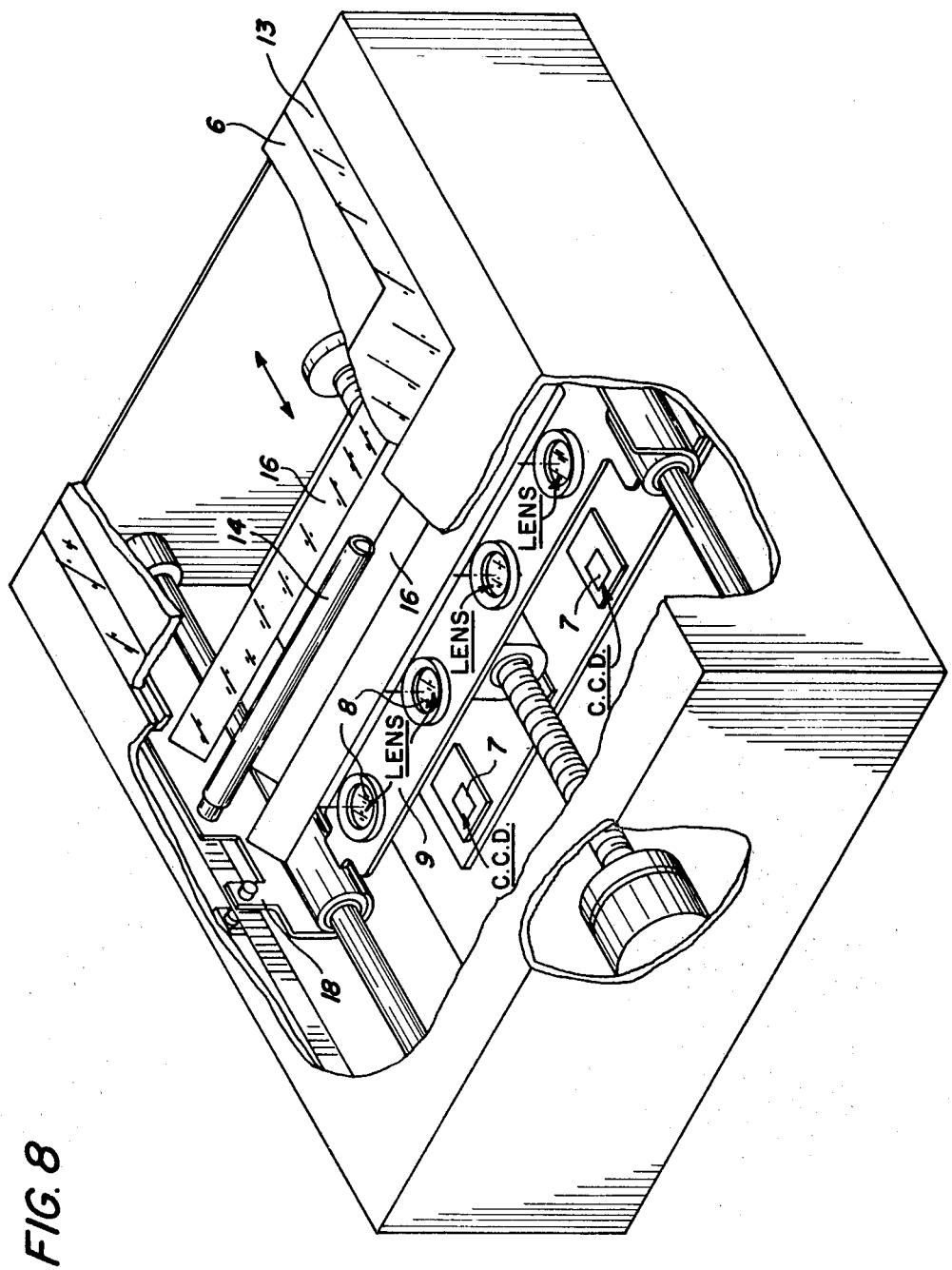
FIG. 8 is an isometric view of an exemplary raster input scanning mechanism.

One suitable scanning apparatus is shown in FIG. 8, and comprises plural CCDs 7, together with lenses 8 supported so that the viewing fields or areas of the CCDs 7 overlap one another to assure continuity of scan. CCDs 7 and lenses 8 are mounted on a movable carriage 9 spacedly disposed below a transparent platen glass 13 upon which the original document 6 to be scanned is placed. A lamp 14 mounted on the carriage 9 provides illumination with a morror combination 16 provided to guide the light rays reflected from the original document to the lenses 8 and the CCDs 7. A timing control 18 synchronizes actuation of the CCDs with movement of the carriage 9 so that as the carriage moves past the platen and the original document thereon, a succession of line scans of the original document are made by the CCDs.

Further details of the aforesaid scanning mechanism may be found in application Ser. No. 793,202, filed May 2, 1977 incorporated by reference herein. Other known methods of generating image data or pixels may be envisioned as for example, a TV camera, etc.

The individual pixels obtained by the scanning apparatus initially comprise analog voltage representations of the gray scale of the area viewed by the individual CCD elements. The CCD elements are driven by a suitable clock 23 (FIG. 3) such that pixels are generated in a serial pixel stream.

For certain purposes, i.e. image storage, transmission, etc. it is advantageous to provide minimal numbers of pixels. At the same time, too few pixels can have adverse affect on the quality of the image produced. The present invention permits minimal input resolution yet provides enhanced image output resolution by interpolating additional or extra pixels 12 between original pixels 10 as seen in FIG. 1. In this embodiment, a one-dimensional interpolator 15 interpolates pixels 12 based on the image value of adjoining pixels 10, it being understood that interpolation may be either on an analog or digital (i.e. 1 or 0) image basis.

In the embodiment shown in FIG. 2, an additional line $L_{1-1}$ is interpolated by a two-dimensional interpolator 17 between line pair $L_1$, $L_2$ using pixels 10 and pixels 12 or in the alternative original pixels 10 only.

It will be understood that more than one pixel 12 may be interpolated between adjoining pixels 10 of a line. Similarly, more than one line may be interpolated between adjoining line pairs. Interpolation of an additional line or lines may be made from a single line (i.e. $L_1$) rather than line pair $L_1$, $L_2$.

Figure 3:
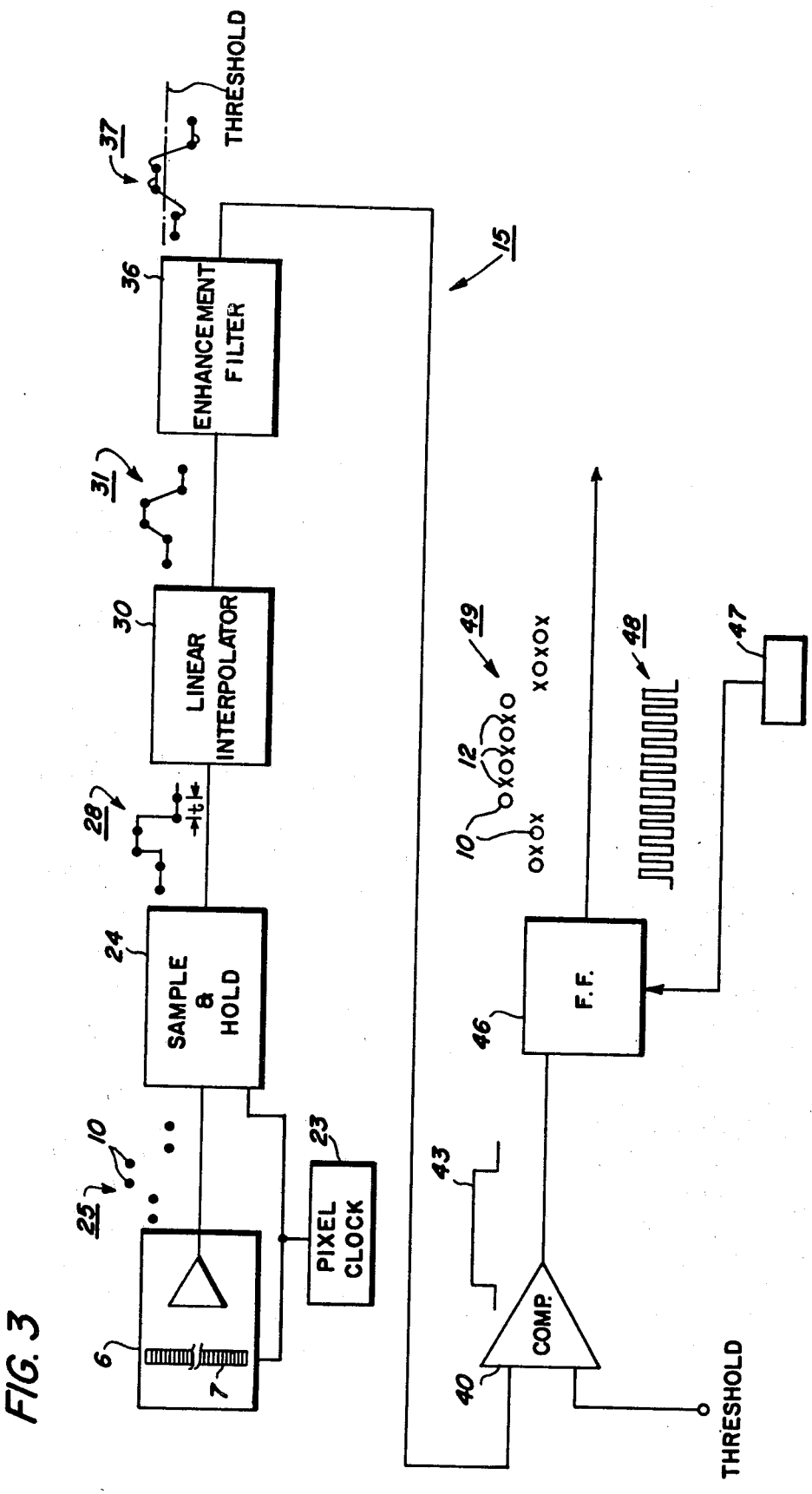
FIG. 3 is a schematic outline of the image pixel interpolating system of the present invention.

Referring now to the embodiment shown in FIG. 3, the stream of pixels 10, obtained for example from a CCD scanning array 7, is inputted to sample and hold circuit 24, which may comprise a Datel Corp. Sample And Hold Model SHMUH circuit. An exemplary input pixel wave form is illustrated at 25. Sample and hold circuit 24, which is driven in synchronization with the pixel stream by pixel clock 23, operates to sample the voltage level of each pixel 10 and to produce a voltage level signal representing the pixel voltage over a preset time interval t following which the next pixel is sampled. The output wave form of sample and hold circuit 24 for the exemplary signal input is shown in 28 and may be described as a "box car" wave. The box car signal output of circuit 24 is fed to a linear interpolator 30 where a linear interpolation is made between different pixel voltage levels over the time interval t. In essence, interpolator 30 generates a sloping signal line bridging between different voltage levels. The modified box car wave output of interpolator 30 is shown at 31.

From interpolator 30, the interpolated signal is fed to an enhancement filter 36. Filter 36 accommodates the relatively rapid dropoff in light transfer efficiency of the optical elements in the signal generating apparatus, i.e. lenses, by enhancing the high frequencies of the signal. The output wave form of enhancement filter 36, for the exemplary signal input, is shown at 37.

The enhanced signal 37 is fed to one gate of a conventional comparator 40 such as Signetic's Inc. Model No. NE 5008 comparator. A preselected voltage threshold level is applied to the other input gate of comparator 40. For signal voltages above the threshold level, the output of comparator 40 is a binary 1; for signals below the threshold level, the output of comparator 40 is a binary 0. The output wave form of comparator 40 for the exemplary signal input 25 is seen at 43.

The square wave output of comparator 40 is fed to a conventional D type flip-flop 46 such as Texas Instrument Model 74-174 Flip Flop. A square wave clock signal 48, the frequency of which is a multiple of pixel clock 23 is inputted to flip-flop 46 from a suitable clock 47. In the exemplary arrangement shown wherein an interpolated pixel 12 is to be provided between each original pixel 10, the frequency of clock 47 is twice that of pixel clock 23. Signal readings are taken off of the rising or leading edge of clock signal 48 to produce a pixel output stream 49 incorporating both original pixels 10 and interpolated pixels 12.

Figure 4:
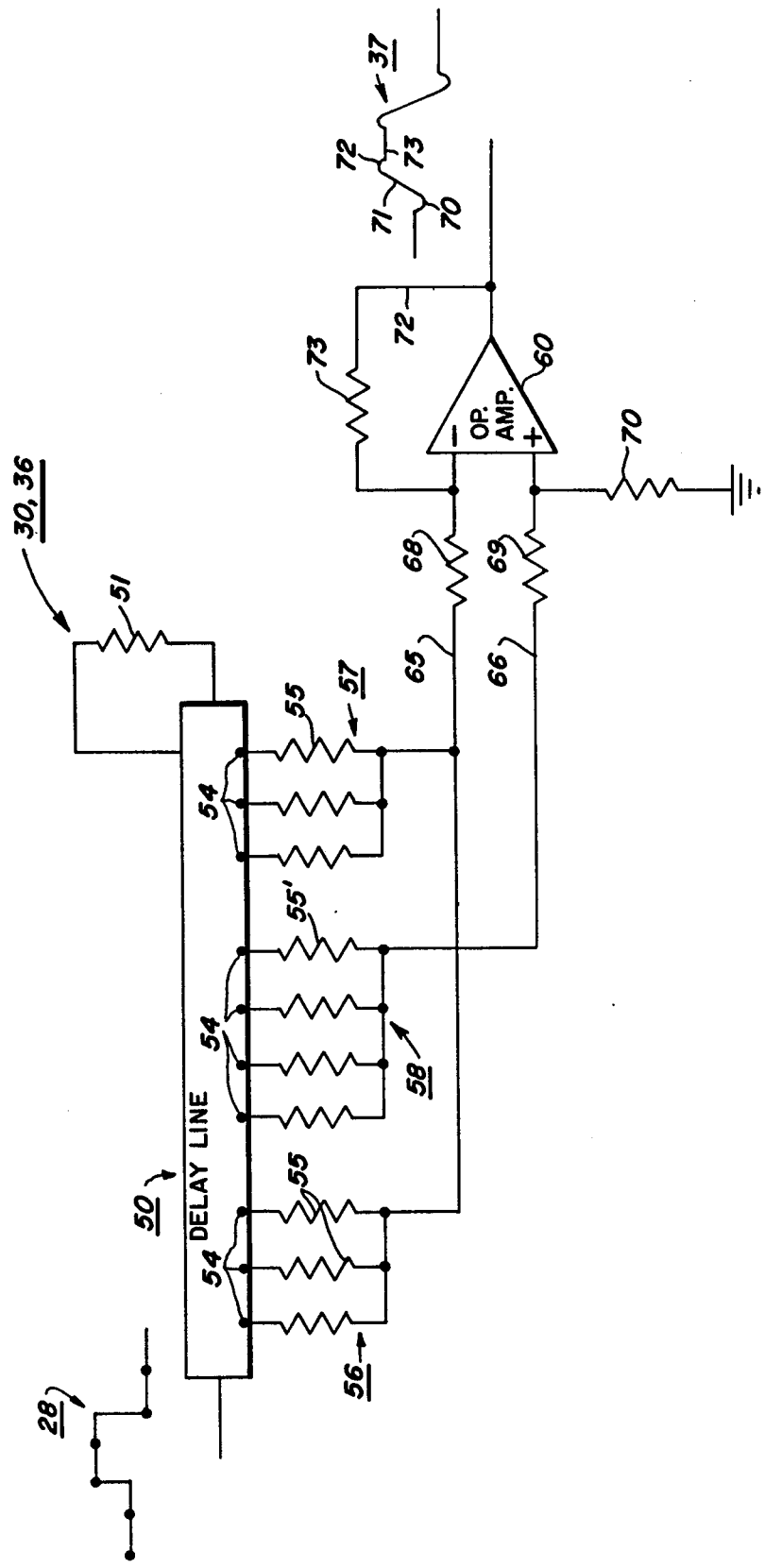
FIG. 4 is a schematic view showing details of the linear interpolator and enhancement filter of FIG. 3.

Referring to FIG. 4, details of linear interpolator 30 and enhancement filter 36 are thereshown. Interpolator/filter 30, 36 comprises a conventional lumped parameter delay line or circuit 50 such as Model No. 2214-1000 by Data Delay, Inc. effective to impose a predetermined delay on the box car signal input from sample and hold circuit 24 as the signal passes from the input terminal of circuit 50 to the output terminal thereof. A series of voltage taps 54 permit tapping off of the signal after preset incremental delays. A termination resistor 51 inhibits voltage reflections.

Taps 54 of delay circuit 50, which are coupled through resistors 55, 55' to the positive and negative terminal of OP amp 60, provide resistor circuits 56, 57 coupled to the negative terminal of AMP 60 and resistor circuit 58 coupled to the positive terminal of AMP 60. OP amp 60 may comprise any suitable operational amplifier such as an R.C.A. Model No. CA-3100 chip. Resistor circuits 56, 57 each comprise a group of three parallel resistors 55 while resistor circuit 58 comprises a group of four resistors 55', in the exemplary embodiment illustrated. Leads 65, 66 which couple resistor circuit 56, 57 and resistor circuit 58 to the negative and positive terminal of OP amp 60 have control resistors 68, 69 respectively in series therewith. Lead 66 is coupled through resistor 70 to ground. Feedback to the negative terminal of OP amp 60 is provided by resistor 73.

The signal input to delay circuit 50 progresses through circuit 50 over a predetermined interval, the length of which is controlled by the design parameters of the delay circuit 50. One suitable interpolation/enhancement filter has voltage taps 54 at equi-distant points with a delay interval of 75 nano seconds per voltage tap and with resistors 55 of 4.0 K ohms, resistors 55' of 9.75 K ohms, resistor 51 of 500 ohms, resistor 68 of 20.5 K ohms, resistor 69 of 3.4 K ohms, resistor 70 of 500 K ohms, and resistor 73 of 36 K ohms.

In operation of interpolator/filter 30, 36 on a change in strength of the signal input from sample and hold circuit 24, as for example, an increase between pixel voltage levels, the increased signal voltage wavefront progressively appears at voltage taps 54 along delay circuit 50. With application of the increased voltage signal to resistors 55 of circuit 56 in succession, the change in input signal strength to the negative terminal of OP amp 60 causes a drop in the output signal of OP amp 60 (shown at 70 in wave form 37). The output signal of amp 60 then rises as the increased voltage signal is applied successively to the resistors 55' of circuit 56 with resulting change in the input signal to the positive terminal of OP amp 60 (shown at 71 in wave form 37). As the increased voltage signal progresses through delay circuit 50 to resistor circuit 57, the signal input to the negative terminal of OP amp 60 undergoes further change resulting in a second dip (shown at 72 in wave form 37) in the output signal of OP amp 60. The signal output of OP amp 60 then stabilizes (shown at 73 in wave form 37) until the next change in the voltage level of the signal input to delay circuit 50.

It will be understood that a decrease in the voltage level of the signal input to delay line 50 produces the opposite effect.

Figure 5:
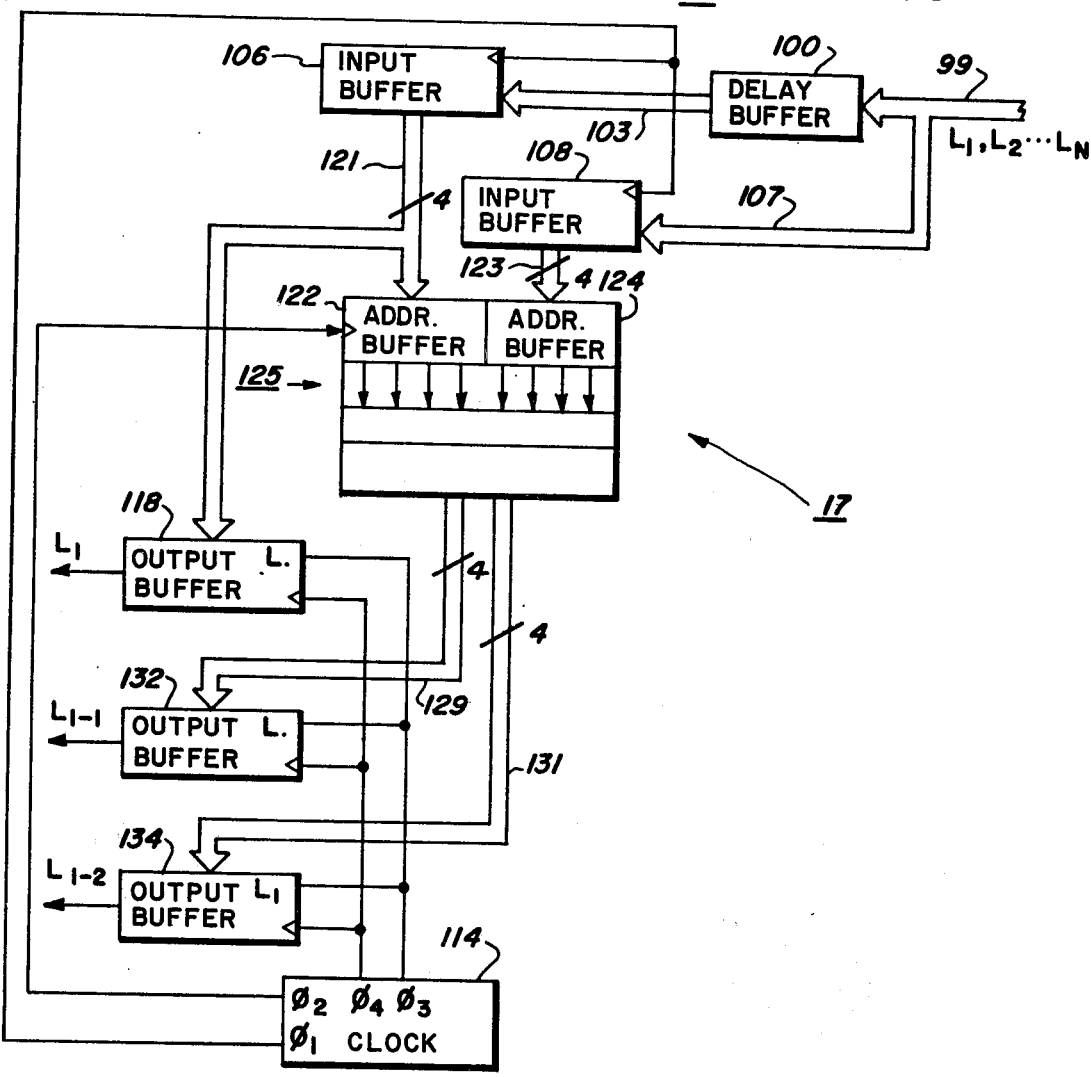
FIG. 5 is a schematic view showing details of the image line interpolation system of the present invention.

Referring to FIG. 5, for line interpolation, binary image data which may or may not include interpolated pixels 12 as aforedescribed, is fed to line interpolator circuit 98 one line pair at a time.

In the exemplary arrangement illustrated, a first line pair, designated as L1, L2 are employed for illustration purposes. It is understood that succeeding line pairs, i.e. lines L2, L3; L3, L4, ... Ln-1$_1$, Ln etc. are treated in the same manner. And while image data is described herein as being processed in blocks of four pixels at a time, processing of other size image data blocks may be readily contemplated. It is further understood that where the original image data is in analog form, the data is converted, as by the interpolation process described heretofore, to binary level (i.e. "1" or "0") image data prior to input to line interpolator circuit 98.

In the arrangement shown in FIG. 5, image data is received in serial pixel form on a line by line basis from a data source, as for example, an image scanning apparatus of the type shown in FIG. 8, or from memory storage, etc., on data input bus 99. Image data in bus 99 is inputted via line delay buffer 100 and data bus 103, and directly via buffer bypass bus 107, to input buffers 106, 108 respectively of interpolator circuit 98. Buffer 100 serves in effect to impose a one line delay on the image data to permit a preceeding line (i.e. line L1) to be compared with the next succeeding line (i.e. line L2) on a pixel by pixel basis. During comparison, as line delay buffer 100 is serially unloaded, the next line (i.e. line L2) is simultaneously loaded into buffer 100 for use in comparing that line (i.e. line L2) with the next succeeding line (i.e. line L3).

Figure 6:
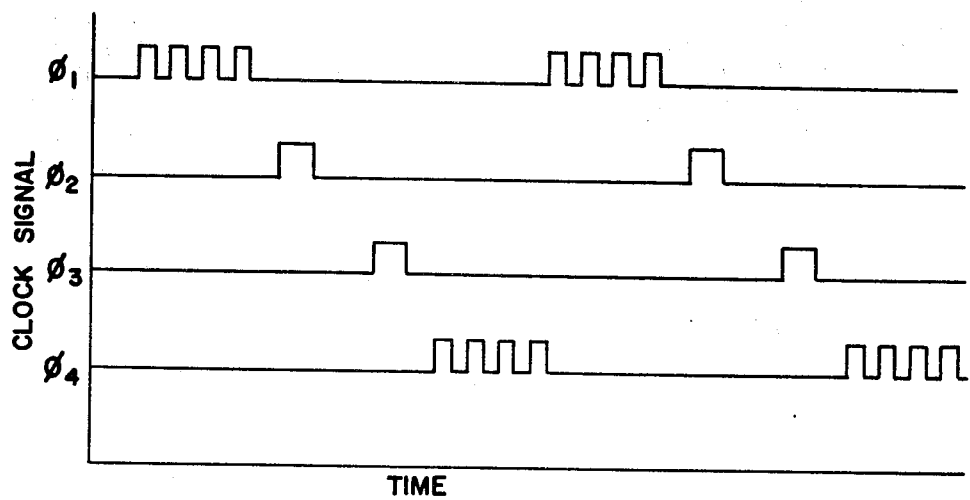
FIG. 6 is a timing chart of the clock pulses for the system of FIG. 5.

A suitable clock 114 provides input pixel clock pulses $\phi_1$, address load control pulses $\phi_2$, output pixel load control pulses $\phi_3$, and output pixel clock pulses $\phi_4$. The wave form of clock pulses $\phi$, $\phi_2$, $\phi_3$, $\phi_4$ for the image processing example described herein is shown in FIG. 6.

The image data from line delay buffer 100 and in bypass buffer 107 is clocked into input buffer pair 106, 108 on a block by block basis by input pixel clock $\phi_1$. It will be understood that clock signal $\phi_1$, or some other clock signal in synchronism therewith, serves to clock image data from the data source forward in input bus 99 to load fresh data into line delay buffer 100 and provide data in bypass bus 107.

In the exemplary arrangement shown, the image data blocks are four pixels wide. Input buffers 106, 108 comprise serial in-parallel out buffers, which in the example illustrated, are four bits wide each to provide an eight bit address to address buffers 122, 124 of pixel pattern memory 125.

On address load control pulse $\phi_2$, the content of input buffers 106, 108 is read through data buses 121, 123 into address buffers 122, 124 respectively. Address buffers 122, 124, which comprise parallel in-parallel out buffers, address a specific image bit pattern stored in memory 125.

Figure 7:
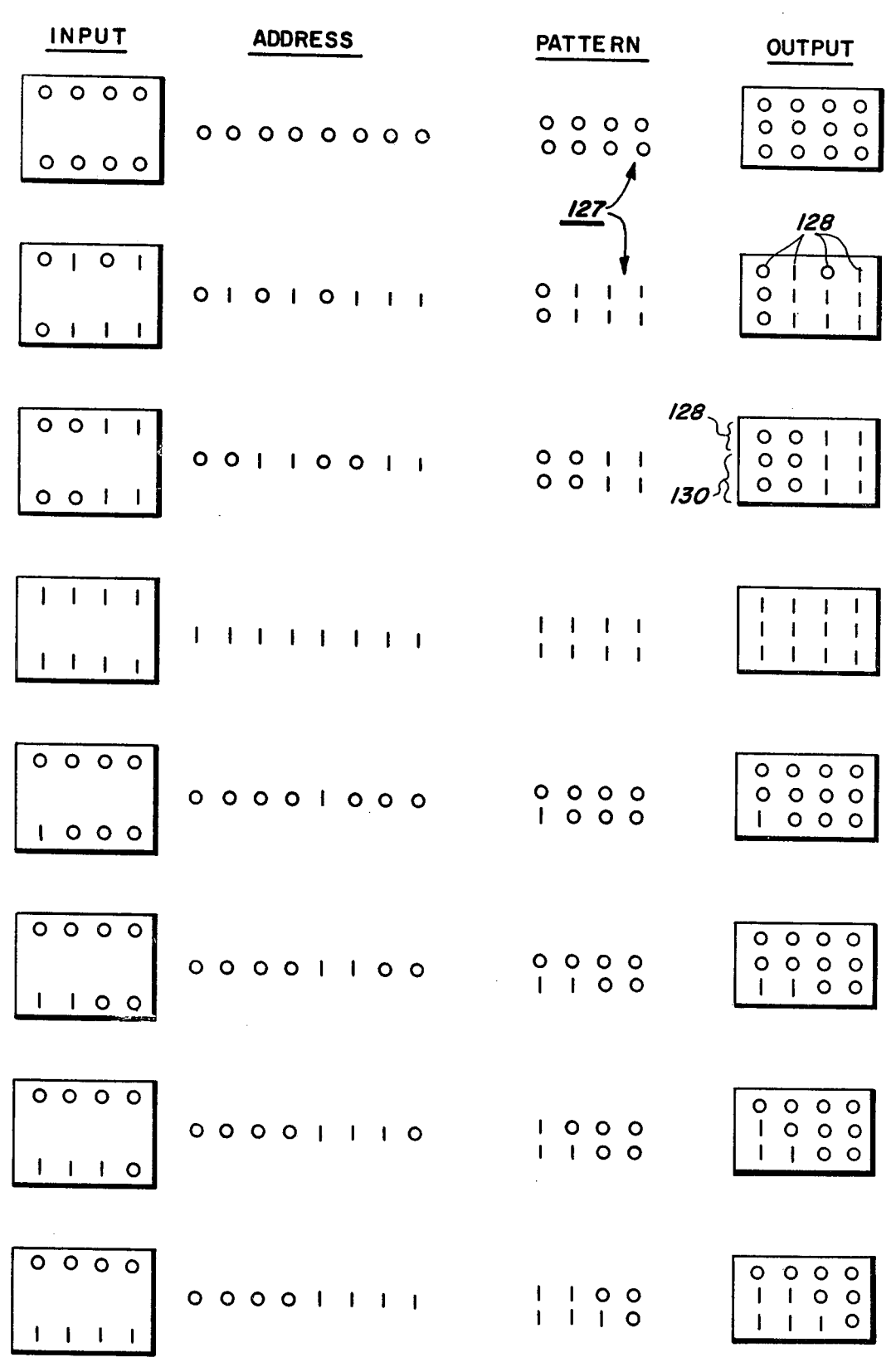

Memory 125, which may comprise any suitable Random Access Memory (RAM), Read Only Memory (ROM), etc., has various image pixel patterns 127, representative samples of which are illustrated in FIG. 7, stored therein. The image data in address buffers 122, 124 addresses the specific image pixel pattern 127 associated with that address. In the example shown, an eight bit address, the sum of the blocks of image data in input buffers 106, 108, is used.

On output pixel load control pulse $\phi_3$, memory 125 loads, via data buses 129, 131, output buffers 132, 134 with the specific image pixel pattern addressed which in the present example results in buffers 132, 134 each being loaded with a specific four pixel block of image data. At the same time, clock pulse $\phi_3$ causes the pixel pattern in input buffer 106 to be read into output buffer 118 through data bus 121.

Output buffers 118, 132, 134 comprise parallel in-serial out buffers. On output pixel clock pulses $\phi_4$, the pixel image data in buffers 118, 132, 134 is serially unloaded to a suitable output such as a memory (not shown) where the image data, comprising both real and interpolated pixels, may be held pending use as for example by a suitable marking or copying device.

The various buffers of interpolator circuit 98 may comprise any suitable commerically available buffers.

In the circuit shown, buffers 100, 106, 108, 118, 132, 134 comprise Texas Instruments Model No. 74-195 buffers, and buffers 122, 124 Texas Instruments Model No. 74-175 buffers. Memory 125 comprises Fairchild Inc. RAM Model No. 93-145 chips.

In the line interpolation arrangement illustrated in FIGS. 5–7, the pixel image output comprises pixels 128 of image data from line $L_1$, together with positionally equivalent pixels 130 of image data for lines L1-1 and L1-2 taken from memory 125. As described, the image data content of lines L1-1 and L1-2 is determined by considering the image values of the positionally equivalent pixels 128 in each of lines L1, L2. It may, however be desirable when interpolator image data for one or more additional lines to base the interpolated image data for the additional line or lines on the image values of one or more pixels outside the positionally equivalent pixels, i.e., on the image values of one or more pixels before and/or after the pixels 128 of lines L1, or L2.

Figure 9:
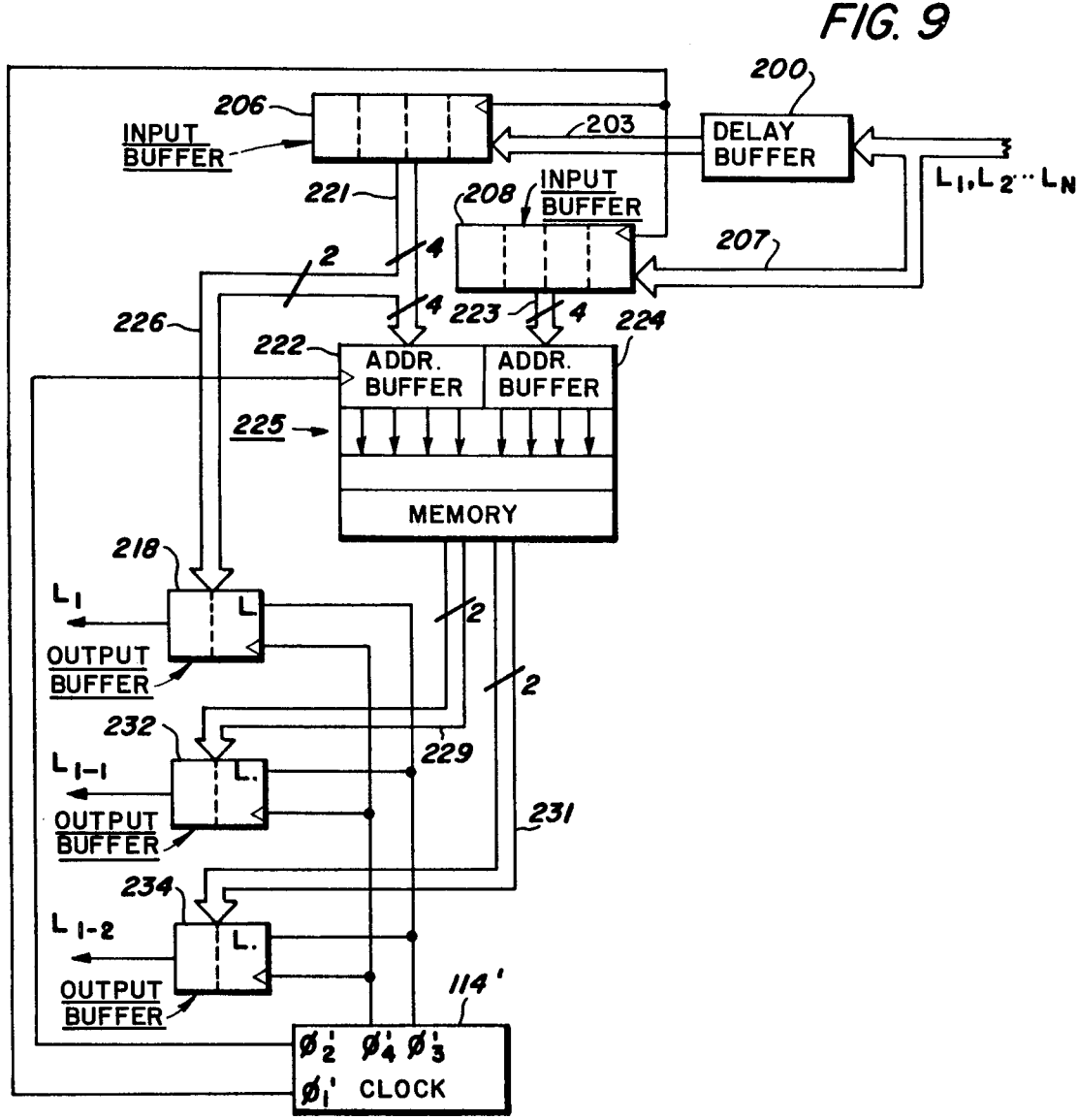
FIG. 9 is a schematic view of an alternate image line interpolation system.
Figure 10:
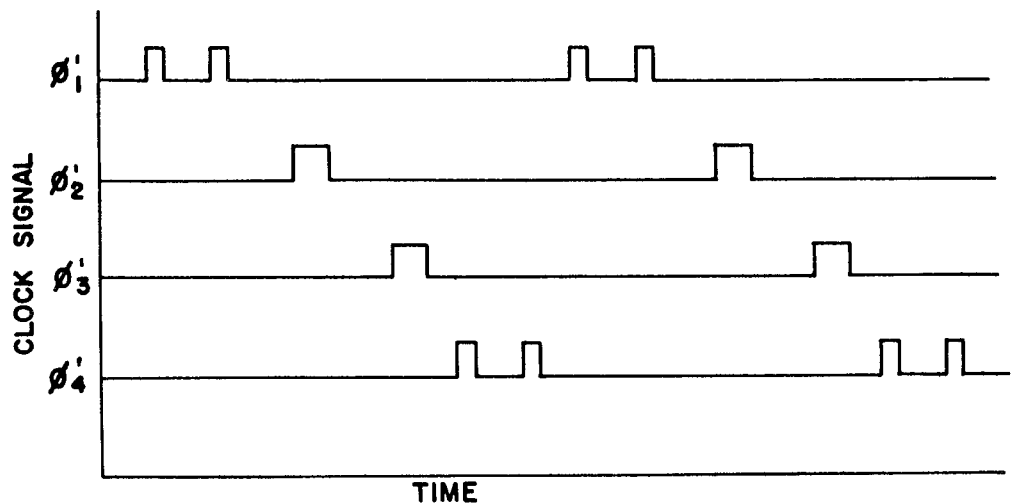
FIG. 10 is a timing chart for the system shown in FIG. 9.
Figure 11:
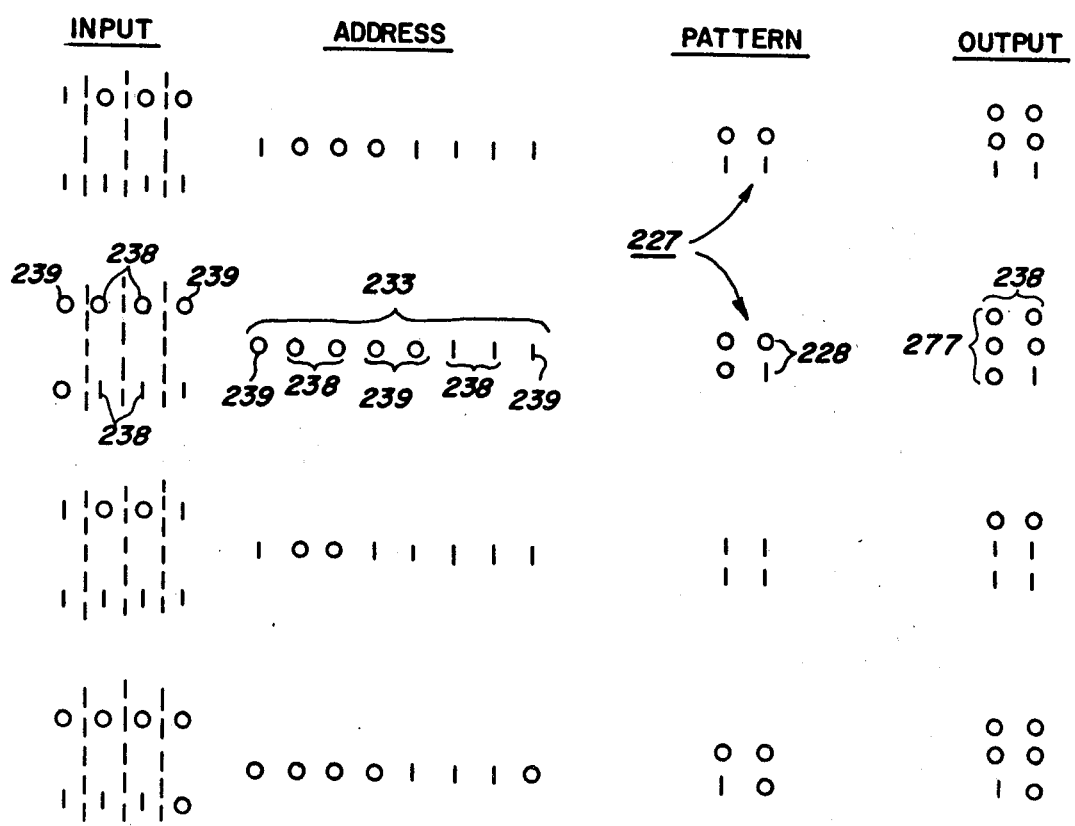
FIG. 11 is a representative illustration of image pixel patterns for the system shown in FIG. 9.

Referring particularly to FIGS. 9–11, there is shown an example of line interpolation wherein the predicted image pixel patterns for the interpolated line or lines (in the example shown, lines L1-1 and L1-2) is based upon the image value of both pixels 239 immediately preceeding and succeeding pixels 238, together with the image value of pixels 238. As seen in FIG. 11, the exemplary image pixel patterns 227 thereshown each comprise a four pixel block 228 consisting of two pixels for each interpolated line L1-1 and L1-2. The memory address for the image pixel patterns 227 comprises an eight pixel address 233 consisting of a block of four successive pixels from each of adjoining lines L1, L2, each block of pixels however being made up of additional end pixels 239 and intermediate pixels 238.

The intermediate pixels 238 in the four pixel address block from line L1 also comprises the pixel output portion of line L1. As a result, the pixel output for lines L1, L1-1, and L1-2 comprises intermediate pixels 238 from line L1 and the particular pixel pattern 227 drawn from memory 225 for interpolated lines L1-1 and L1-2.

In the arrangement shown in FIG. 9, image data is received in serial pixel form on a line by line basis from a data source, as described heretofore, and inputted via line delay buffer 200, data bus 203, and bypass bus 207, to input buffers 206, 208 respectively of the interpolator circuit.

A suitable clock 114' provides input pixel clock pulses $\phi_1'$, address load control pulses $\phi_2'$, output pixel load control pulses $\phi_3'$, and output pixel clock pulses $\phi_4'$. The wave form of clock pulses $\phi_1'$, $\phi_2'$, $\phi_3'$, $\phi_4'$ for the image processing example described herein is shown in FIG. 10.

The image data from line delay buffer 200 and in bypass buffer 207 is clocked into input buffer pair 206, 208 on a block by block basis by input pixel clock $\phi_1'$, each block being two pixels wide. Clock signal $\phi_1'$, or some other clock signal in synchronism therewith, is also used to clock image data from the data source forward into line delay buffer 200 and bypass bus 207.

In the exemplary arrangement shown, input buffers 206, 208 comprise serial in-parallel out buffers, which in the example illustrated, are four bits wide each to provide an eight bit address to address buffers 222, 224 of pixel pattern memory 225.

On address load control pulse $\phi_2'$, the content of input buffers 206, 208 is read through data buses 221, 223 into address buffers 222, 224 respectively. Address buffers 222, 224, which comprise parallel in-parallel out buffers, address a specific image bit pattern 227 stored in memory 225, examples of which are shown in FIG. 11.

On output pixel load control pulse $\phi_3'$, memory 225 loads, via data buses 229, 231, output buffers 232, 234 with the specific image pixel pattern addressed which in the present example results in buffers 232, 234 each being loaded with a specific two pixel block of image data. At the same time, clock pulse $\phi_3'$ loads the intermediate pair of pixels in input buffer 206 into output buffer 218 through data bus 226.

On output pixel clock pulses $\phi_4'$, the pixel image data in buffers 228, 232, 234 is serially unloaded to a suitable output as described heretofore.

On the succeeding clock pulse $\phi_1'$, two fresh pixels from lines L1, L2 are loaded into input buffer pair 206, 208 and the foregoing process repeated.

In the line interpolation process of FIGS. 9–11, the content of the interpolated lines L1-1 and L1-2 is determined from the image values of the pixels in lines L1, L2. The portion of lines L1, L2 locked at for interpolation purposes includes the pair of pixels 238 positionally corresponding to the interpolated pixels and a single pixel 239 from before and after the pixels 238. It will be understood, however, that the number of pixels 239 looked at may be greater than one and further, that only the pixel(s) before or after the pixels 238 may be looked at. And, while the pixels 238 from lines L1, L2 and in image pixel patterns 227 are illustrated as being two pixels wide, the pixel width may range from a low of one pixel to a number greater than the two pixels illustrated in FIGS. 9–11.

While in the aforedescribed arrangements, a pair of intermediate lines (i.e. L1-1 and L1-2) are interpolated from adjoining pairs, it will be appreciated that the number of lines interpolated may be as few as one. It will also be understood that the accuracy of the interpolation process decreases with increase in the number of intermediate lines interpolated. And, while interpolation has been described herein using a pair of adjoining lines to predict one or more intermediate lines, the aforedescribed interpolation process may instead employ a single known line as the basis for predicting one or more adjoining lines.

It is understood that the eight pixel address illustrated, the composition thereof as four pixels from adjacent lines (i.e. lines L1, L2), and the two and four pixel wide two line interpolating image patterns stored in memory are exemplary only, and that addresses of various pixel length and composition as well as image patterns of various pixel length and/or various numbers of interpolated lines may be contemplated instead.

While interpolation of additional pixels 12 may be performed at any point in a data system including the data output station or terminal, since the image data used comprises analog image data, preferably such interpolation is performed at the input station. This avoids the expense of storing data in analog form. The image data, which following interpolation is in binary form, may then be stored and/or transmitted. Transmission of the image data from one site, i.e. the input station to another site, i.e. an output station, may take place in any suitable manner as known to those skilled in the facsimile arts for example.

Line interpolation, which may be performed at any point in a data system including the input station, is preferably performed at the data output station or terminal to reduce data storage needs and transmission bandwidth.

While the invention has been described with reference to the structure disclosed, it is not confined to the details set forth, but is intended to cover such modifications or changes as may come within the scope of the following claims:

What is claimed is:

1. In the method of interpolating at least one line of image data from at least one known line of image data, the steps comprising:
    (a) buffering a block of binary image pixels from said known line of image data to provide an address;
    (b) addressing a memory having discrete image pixel patterns therewithin with said address to obtain the preset image pixel pattern corresponding to said address;
    (c) outputting the preset image pixel pattern addressed from said memory to provide a portion of the interpolated line; and
    (d) repeating steps a, b, and c using additional blocks of image pixels from said known line to complete said interpolated line of image data.

2. The method according to claim 1 including the step of storing discrete image pixel patterns in memory having a pixel length equal to the pixel length of said address.

3. The method according to claims 1 or 2 including the step of buffering a block of image pixels from said known line having a bit length equal to the bit length of said address.

4. The method according to claim 1 including the step of buffering a predetermined number of binary image pixels from each of two adjoining lines of known image data for use as said address.

5. The method according to claims 1 or 4 including the step of providing in said memory image pixel patterns for producing at least two interpolated lines.

6. The method according to claims 1 or 4 including the step of providing in said memory image pixel patterns for producing at least three interpolated lines.

7. The method according to claim 4 including the step of buffering a block of at least one image pixel from each of said adjoining lines for use as said address.

8. In the method of interpolating at least one intermediate line of image data from each pair of adjoining lines of image data, the steps comprising:
    (a) buffering at least one binary image pixel from each of said pairs of adjoining lines of image data to provide an address;
    (b) addressing a memory having discrete image pixel patterns therewithin with said address to obtain the preset image pixel pattern corresponding to said address;
    (c) outputting the preset image pixel pattern addressed from said memory to provide a portion of said intermediate line; and
    (d) repeating steps a, b, and c using additional image pixels from said pairs of adjoining lines of image data to complete said intermediate line.

9. The method according to claim 8 including the step of storing multi-line image pixel patterns in memory.

10. The method according to claim 1 including the step of storing image pixel patterns having a pixel length less than the pixel length of said address.

11. The method according to claim 1 including the step of providing an address comprised of a pixel from said known line positionally corresponding to each pixel of said line of image data to be interpolated together with at least one additional pixel from said known line.

12. The method according to claim 1 including the step of providing an address comprised of a pixel from said known line positionally corresponding to each pixel of said line of image data to be interpolated together with plural additional pixels from said known line, with at least one of said additional pixels preceeding said positionally corresponding pixel.

13. The method according to claim 1 including the step of providing an address in which only a portion of the pixels comprising said address positionally correspond to the pixels in said line of image data being interpolated.

* * * * *